United States Patent Office 2,749,285
Patented June 5, 1956

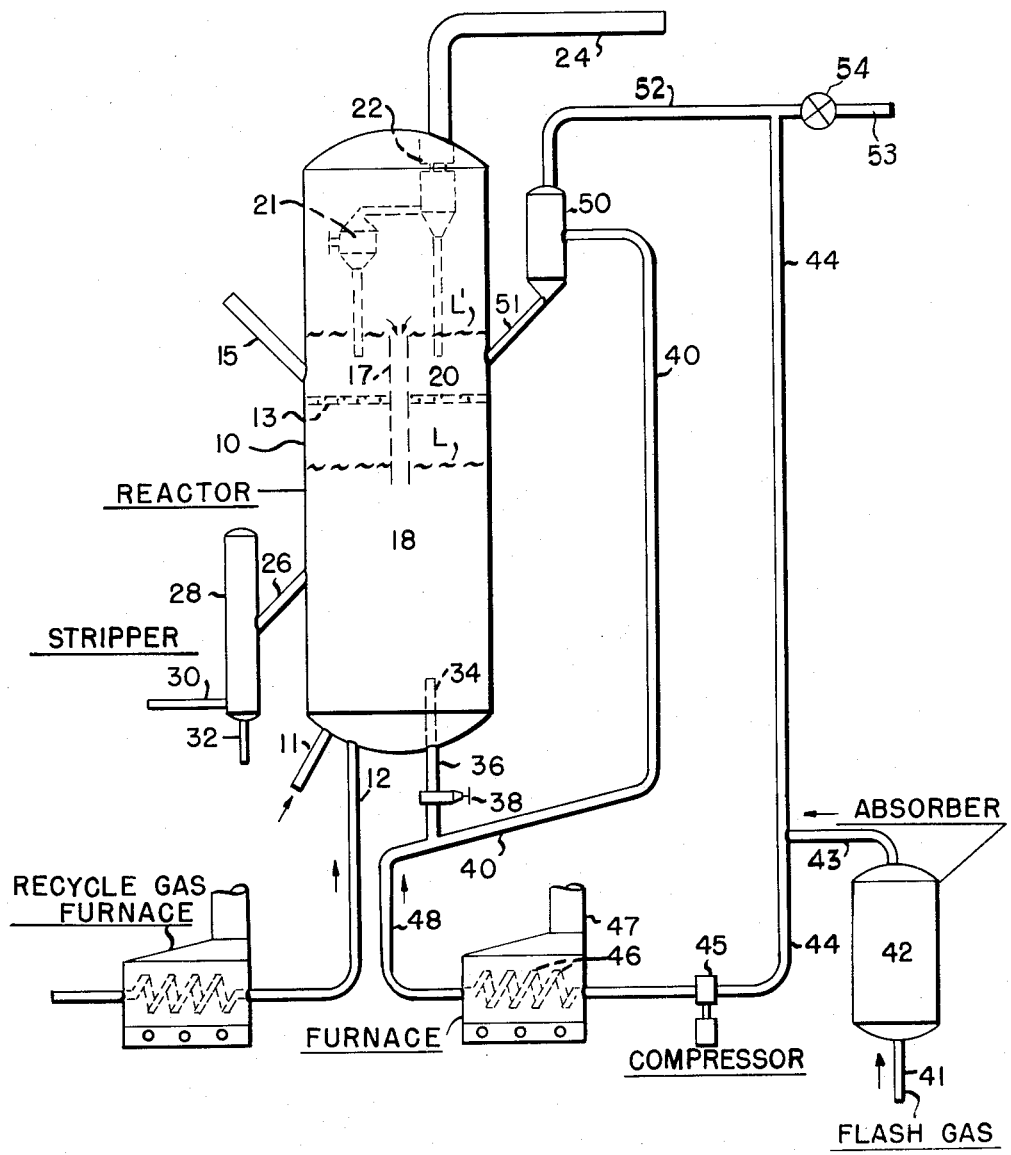

2,749,285

FLUID HYDROFORMING PROCESS

Robert J. Fritz, Baton Rouge, La., assignor to Esso Research and Engineering Company, a corporation of Delaware Application January 2, 1953, Serial No. 329,179

3 Claims. (Cl. 196—50)

This invention pertains to hydrocarbon conversion processes and particularly to hydroforming or the conversion of lower boiling naphtha fractions of low octane rating into highly aromatic products having good anti-knock properties by the fluidized solids technique.

Hydroforming is a well-known process for treating hydrocarbon fractions boiling within the motor fuel or naphtha range to upgrade the same or increase the aromaticity and improve the anti-knock characteristics of said hydrocarbon fractions. By hydroforming is ordinarily meant an operation conducted at elevated temperatures and pressures in the presence of solid catalyst particles and hydrogen, whereby the hydrocarbon fraction is increased in aromaticity through dehydrogenation of naphthenes and dehydrogenation, isomerization and cyclization of the paraffins in which operation there is no net consumption of hydrogen. Hydroforming operations are ordinarily carried out in the presence of hydrogen or hydrogen-rich recycle gas (i. e. at relatively high hydrogen partial pressure) in the pressure range of from about 50 to 1000 lbs. per sq. inch, at temperatures of about 750–1150° F. and in contact with such catalysts as molybdenum oxide, chromium oxide, or, in general, oxides or sulfides of metals of groups IV, V, VI, VII and VIII of the periodic system of elements, alone, or preferably supported on a base or spacing agent such as alumina gel, precipitated alumina or zinc alumina spinel.

It has been proposed to effect the hydroforming of naphtha fractions in a fluidized solids reactor system in which naphtha vapors are passed continuously through a dense, fluidized bed of hydroforming catalyst particles in a reaction zone, spent catalyst particles are withdrawn from the dense bed in the reaction zone and passed to a separate regeneration zone where inactivating carbonaceous deposits are removed by combustion whereupon the regenerated catalyst particles are returned to the main reactor vessel or hydroforming reaction zone. Fluid hydroforming as thus conducted has several fundamental advantages over fixed bed hydroforming such as (1) the operations are continuous, (2) the vessels can be designed for single rather than dual functions, (3) the reactor temperature is substantially constant throughout the dense bed and (4) the regeneration or reconditioning of the catalyst can be readily controlled.

An advantage of the foregoing fluidized solids operation has been the fact that the freshly regenerated catalyst can be utilized to carry part of the heat required for the hydroforming reaction from the regeneration zone into the reaction zone. It has been proposed in this connection to discharge hot, freshly regenerated catalyst particles into a stream of hot, hydrogen-rich recycle gas in a transfer line whereby the catalyst particles are subjected to a reconditioning treatment during their passage through the transfer line into the reactor. This reconditioning or pretreatment of the regenerated catalyst involves at least a partial reduction of higher catalytic metal oxides formed during regeneration to a lower or more catalytically active form of catalytic metal oxide. In view of the high temperature of the regenerated catalyst (1050–1200° F.) and of the recycle gas (1100–1250° F.) and the exothermic character of the reaction between the hot, freshly regenerated catalyst and the hydrogen, it is necessary to make the transfer line very short and of small diameter in order to keep the time of contact of the freshly regenerated catalyst and the hydrogen or hydrogen-containing gas sufficiently short to avoid overtreatment and/or thermal degeneration of the catalyst. It has been proposed to alleviate this problem by heat exchanging or directly mixing recycle reactor catalyst with the freshly regenerated catalyst to lower and control the temperature of pretreatment while simultaneously recovering the sensible heat of the regenerated catalyst as well as the heat released by the partial reduction of the catalytic metal oxides for use in the main or hydroforming reaction zone.

This expedient permits the recovery of a substantial amount of heat for use in the hydrocarbon conversion or hydroforming operation. However, the total amount of heat that may be recovered and supplied to the reaction zone by the catalyst is limited by the low catalyst to oil ratios that must ordinarily be maintained in reforming reactions in order to minimize carbon formation. Since the amount of heat that may be introduced by the catalyst is insufficient to carry out the reforming reaction it is common practice to preheat the feed stock and the recycle or hydrogen-rich gas to temperatures well above the average reactor temperature to supply the heat necessary for the conversion. This preheating has an adverse effect upon the total yield of liquid products since it causes thermal degradation of the feed naphtha as well as some of the higher molecular weight constituents of the recycle gas. Moreover, excessively large amounts of recycle gas must be introduced to carry heat to the conversion zone. This is particularly objectionable in fluid hydroforming since in operations at 200 lbs. per sq. inch the superficial velocity of gaseous or vaporous reactants must be held below about one foot per second to avoid excessive entrainment of catalyst from the reactor dense bed. Moreover, introduction of hot recycle gas (at or around 1200° F.) at permissible rates or superficial velocities offers the distinct possibility that high temperature gradients or zones of localized overheating will be formed in the reactor dense bed in the region where the recycle gas is introduced. Moreover, introduction of heat into the reactor via the recycle gas is very inefficient because of the fact that the recycle gas on leaving the reactor at about 900° F. is cooled down to separator temperatures (roughly 100° F.) and then is heated back to 1200° F. for recycling. While some of the heat removed from the recycle gas in cooling from 900° F. to 100° F. is recovered by heat exchange with incoming feed or recycle gas this requires expensive heat exchange equipment and larger heat input capacity must be provided in the recycle gas preheat furnace.

It is the object of this invention to provide the art with an improved method for reforming hydrocarbon fractions by the fluidized solids technique.

It is also the object of this invention to provide the art with an improved method for supplying the heat of reaction to a hydroforming reactor system employing fluidized solid catalyst particles.

It is a further object of this invention to provide the art with an improved method for reforming hydrocarbon fractions by the fluidized solids technique which permits the use of minimum amounts of hydrogen-containing recycle gas.

These and other objects will appear more clearly from the detailed specification and claims which follow.

It has now been found that hydrocarbon fractions which boil within the motor fuel or naphtha range can be reformed in an advantageous manner in accordance with the fluidized solids technique if a stream of catalyst particles is withdrawn from the reactor and, preferably after suitable stripping, is contacted with a stream of hot gas which serves to heat the reactor catalyst particles substantially above average reactor temperature and to carry the heated catalyst to suitable gas-solids separating means arranged above the reactor. Hot reactor solids are separated from the gas in the separator and the solids are discharged back into the reactor via a standpipe or the like while the gas is taken from the separator, compressed to such extent as is necessary for recirculation, reheated to say 1200° F. and then recycled for conveying and heating reactor catalyst. In other words the gas serves as a heat exchange medium which is heated to say about 1200° F., cooled to about 925–975° F. by contact with a stream of recycle reactor catalyst and after separation from the catalyst is recompressed and heated again to about 1200° F. for recirculation in the reactor catalyst heating system. The gas is kept in an essentially closed system or circuit and is not subjected to further cooling after heat exchange with the recycle reactor catalyst stream before it is recompressed and reheated for recirculation in the system. The gas used for heating the catalyst can be practically any non-oxidizing gas, for example, nitrogen or scrubbed flue gas, hydrogen, methane or other light refinery gas or it may be a gas similar to the ordinary recycle gas of the process but which is preferably freed of $C_4$ and higher hydrocarbon materials by passage through an absorber, but which is kept in an essentially closed circuit and at temperatures above about 900° F. It is possible in this way to minimize heat input by way of preheating of the naphtha feed and the recycle gas and the total quantity of recycle gas supplied to the reaction zone can be kept to the bare minimum necessary for control of carbon formation. If the carryover of catalyst with the heating gas creates a problem in compressing the gas preparatory to reheating and recycling it is possible to pass the gas through a hot oil scrubber, a filter or the like to alleviate this problem. This system of supplying heat to the reactor can be utilized to establish an inverse temperature gradient in the reactor by supplying the heated recycled reactor catalyst to the upper part of the reactor vessel and providing baffling between the upper and lower parts of the reactor so as to prevent or minimize solids mixing between the two sections and by withdrawing cool reactor catalyst particles for reheating from the bottom or lower section of the reactor.

Reference is made to the accompanying drawing illustrating one embodiment of the present invention.

In the drawing, 10 is a reactor vessel which may be a vertical cylindrical vessel of considerable length or height. An inlet line 11 for the supply of preheated feed stock and an inlet line 12 for the supply of preheated recycle gas are connected to the bottom of the reactor vessel 11. Distributor rings may be arranged within the vessel to insure uniform distribution of the incoming feed and recycle gas over the entire cross section of the reactor vessel or a perforated plate or distribution grid can be arranged within the vessel for this purpose. In order to establish an inverse temperature gradient or a final reaction zone having a higher average temperature than the average temperature in the initial reaction zone, the reactor vessel is provided with one or more horizontal perforated plates or baffles 13. Regenerated catalyst with or without pretreatment is charged to the reactor vessel through inlet line 15 in the upper part of the vessel. An overflow conduit 17 is arranged to maintain a certain level of catalyst above the perforated plate or baffle member 13, and to provide a conduit for discharging catalyst particles overflowing its upper end into the initial reaction zone in the lower part of the vessel. The catalyst is in a finely divided form and is maintained as a dense, turbulent, fluidized bed 18 in the lower part of the vessel and a similar bed 20 above the baffle member 13 by the passage of naphtha feed vapors and recycle gas therethrough. The lower dense bed 18 has a definite level L and the upper dense bed 20 has a definite level L'. Reaction products and unreacted feed passes overhead from dense bed 18 carrying small amounts of entrained catalyst and is discharged through perforated plate 13 into the bottom of upper dense bed 20. Reaction products and a small amount of unreacted feed passes overhead from dense bed 20 through cyclone separators 21 and 22 which serve to knock out substantially all the catalyst particles that are entrained with the reaction products. The separated catalyst particles are returned to the dense bed through the dip pipes attached to the bottom of the cyclone separator while the reaction products essentially free of catalyst particles are taken through product outlet line 24 to suitable fractionating and storage equipment.

A stream of reactor catalyst is withdrawn through withdrawal line 26 into spent catalyst stripper 28. Stripping gas such as steam, nitrogen or the like is introduced into the lower part of stripper 28 to remove hydrogen and hydrocarbon adsorbed on or entrained with the spent catalyst particles. The stripping gas and stripped out materials pass through the upper part of the stripper (not shown in the drawing) and are discharged either into the upper part of vessel 10 for admixture with reaction products vapors for passage through the cyclone separators 21 and 22 or directly into the products outlet line 24. Stripped spent catalyst is discharged from the bottom of stripper 28 into conduit 32 for passage to suitable regeneration equipment (not shown) where carbonaceous deposits are burned off the catalyst in known manner. The regenerated catalyst particles are returned to the reactor vessel 10 through transfer line 15 and may be given a conditioning or pretreatment with hydrogen-containing gas or may be recycled to the reactor with only a stripping with inert gas before being discharged into the reactor vessel.

A well 34 is arranged in the lower part of the reactor vessel for the withdrawal of a second stream of reactor catalyst. An inlet 36 for supplying a suitable stripping gas such as hydrogen or light gaseous hydrocarbons is provided on line 34 in order to strip feed or product vapors that are adsorbed on or entrained with the catalyst particles. The stripped catalyst particles are discharged through slide valve 38 into heater-riser line 40 where they are picked up by a stream of hot gas.

Since the heating gas is maintained in a substantially closed circuit and does not enter the reactor vessel in any appreciable amount it may be any non-oxidizing gas. Oxidizing gases should not be used because of their effect upon the state of oxidation of the catalyst and the fact that oxidation of the reactor catalyst in this heating recycle system will in turn require the consumption of hydrogen to restore the catalyst to its more active form. A suitable gas would be flash gas or excess recycle gas produced in the hydroforming process. When flash gas is used it is desirable to separate the $C_4$ and higher hydrocarbons therefrom. Accordingly flash gas supplied through line 41 is passed through absorber 42 where it is contacted with a suitable absorber oil for scrubbing out $C_4$ and higher hydrocarbons. The scrubbed gas passes through line 43 into recycle line 44 through which it passes to blower or compressor 45 where it is brought up to the pressure required for circulation in the recycle reactor catalyst heater system. The compressed gas passes from blower 45 through heating coils 46 in furnace 47. The hot, compressed gas is passed through line 48 into heater riser line 40 where it picks up the stripped reactor catalyst discharged from line 34.

The mixture of reactor catalyst and gas passes upwardly through heater-riser line 40 to separator 50 where heated catalyst particles are separated from the gas. The catalyst particles pass through line 51 back into the reactor vessel 10 while the gas, substantially free from catalyst particles passes overhead through line 52 into gas recycle line 44. Any purging of the heating gas that may be required can be effected through purge or relief line 53 and valve 54. The gas is passed through line 44 to compressor 45 for recycling through the heating circuit. If the amount of catalyst entrained with the gas taken overhead from separator 50 interferes with the operation of blower 45, filters, scrubbers or the like may be provided in the recycle gas line 44 in order to alleviate this problem.

A typical operation in accordance with this invention is as follows:

The reactor system is charged with a suitable hydroforming catalyst such as 10% molybdenum oxide upon activated alumina. Naphtha feed is preheated to approximately 1000° F. and supplied to inlet line 11, while hydrogen-rich process gas or recycle gas is preheated to about 1100° F. and supplied to the reactor through line 12. In view of the heating of recycle reactor catalyst, the amount of recycle gas can be kept low, i. e. about 2000–3000 cu. ft. per barrel of feed and the preheat can also be kept low; i. e. about 1100° F. or lower. Catalyst is continuously withdrawn from the reactor, regenerated and returned to the reactor through line 15 at a temperature of about 1150° F. and at a catalyst-to-oil ratio of approximately one. Catalyst is also withdrawn continuously from the reactor through withdrawal well 34 at a temperature of about 875° F. and at a rate of about three pounds per pound of oil fed to the reactor. Heat exchange gas is circulated through the recycle reactor catalyst heater circuit at a rate of about 3000 cu. ft. per barrel of oil feed to the reactor and is heated to about 1200–1250° F. at the outlet end of heating coil 46. The heat exchange gas raises the temperature of the recycle reactor catalyst to about 950–975° F. whereupon the hot recycle reactor catalyst is separated from the heating gas and returned to the reactor through line 51 while the heat exchange gas at about 950–975° F. is passed to the compressor 45, reheated to 1200–1250° F. in the furnace 47 and recycled through the heater-riser 40. With the reactor vessel separated by the baffle or plate 13 into two zones as shown and supplying the regenerated catalyst and the hot recycle reactor catalyst to the upper or final reaction zone, it is possible to maintain an inverse temperature gradient, for example an average reactor temperature of about 875° F. in the lower or initial reaction zone and about 925° F. in the upper or final reaction zone. It is also possible to utilize the present invention in reactor vessels having a single dense fluidized bed or more than two stages can be provided by increasing the number of plates and downcomers. When two or more stages are provided, it is preferable to supply the regenerated catalyst and heat recycle reactor catalyst to the final reaction stage in order that the maximum temperature will be maintained in said final reaction stage.

The feed or charging stock to the hydroforming reactor may be a virgin naphtha, a cracked naphtha, a Fischer-Tropsch naphtha or the like having a boiling range of from about 125–450° F. or it may be a narrow boiling cut within this range. The feed stock is ordinarily preheated to about 800–1000° F., preferably about 950° F. Thermal degradation of the feed naphtha at preheat temperatures can be minimized by limiting the time of residence thereof in the transfer and feed inlet lines.

The recycle gas, which contains from about 50–80 volume per cent hydrogen is preheated to temperatures of about 1050–1200° F., preferably below about 1100° F. to minimize the danger of cracking any $C_4$ or higher hydrocarbons in the recycle gas. The recycle gas may be circulated through the reactor at a rate of from about 1000 to 8000 cu. ft. per barrel of naphtha feed. Since the recycle gas is not used to supply a major part of the heat to the reaction zone it may be used only in such amount as is necessary to control carbon formation; for example in amounts of less than about 3000 cu. ft. per barrel of feed.

The reactor system is charged with a mass of finely divided hydroforming catalyst particles. Suitable reforming catalysts include group VI metal oxides such as molybdenum oxide, chromium oxide, tungsten oxide or vanadium oxide or mixtures thereof preferably dispersed upon a support or carrier such as activated alumina, zinc aluminate spinel or the like. Instead of these catalysts, it is also possible to use catalysts comprising from about 0.1 to 2.0 wt. percent platinum or 0.5 to 5.0 wt. percent palladium upon a support such as activated alumina or the like. Preferred catalysts contain about 5 to 15 wt. percent molybdenum oxide or from about 10 to 40 wt. percent chromium oxide upon activated alumina or upon zinc aluminate spinel or about 0.5 wt. percent platinum upon alumina, preferably a pure alumina derived from an aluminum alcoholate such as aluminum amylate. If desired, minor amounts of stabilizers and promoters such as silica, calcium, ceria, or potassia can be included in the catalyst. The catalyst particles are, for the most part, between 200 and 400 mesh in size or about 0–200 microns in diameter with a major proportion between 20 and 80 microns. It is preferred that the catalyst be in spherical or spheroidal form.

The hydroforming reactor vessel is operated at temperatures between about 850 and 950° F. When operating with one or more plates or grids in the reactor and with an inverse temperature gradient, it is preferred to operate the first reaction zone at an average temperature from about 25 to 75° F. lower than the average temperature in the final reaction zone. A suitable operation, for example, would be one in which the average temperature in the lower or initial reaction zone is about 850–900° F. and the average temperature in the final reaction zone is about 900–950° F. Small amounts of water vapor are present in the reaction zone due principally to the presence of water in the feed and in the recycle gas and also due to the formation of water in the regeneration of the spent catalyst as well as the reduction of the regenerated catalyst in a pretreater or in the reactor vessel itself. The presence of these small amounts of water permits operation at somewhat higher temperatures without loss in selectivity than is possible in systems lacking this small water partial pressure.

Regeneration of the spent reactor catalyst of the molybdenum oxide-alumina type is effected at essentially the same pressure as is maintained in the hydroforming reaction zone and at temperatures of about 1100–1200° F. The average residence time of the catalyst in the reactor and the reactor catalyst heating recycle system is of the order of from about 3 to 4 hours while the average residence time of the catalyst in the regenerator is of the order of from about 3 to 15 minutes. In some cases, particularly when running high sulfur content feeds, it may be desirable to increase the holding time of the catalyst in the regenerator to about an hour. When platinum-containing catalysts are used it is possible to operate for extended periods without regenerating the catalyst. Accordingly, it is preferable to operate the reactor as a batch-fluid unit and to regenerate the catalyst only after relatively long periods of operation.

The weight ratio of catalyst to oil introduced into the reactor should be about 0.5 to about 3.5. It is preferred to operate at catalyst to oil ratios of about 1 since higher ratios ordinarily tend to give excessive carbon formation. Somewhat higher weight ratios can be used at higher pressures.

Space velocity or the weight in pounds of feed charged per hour per pound of catalyst in the reactor depends upon the age or activity level of the catalyst, the character of the feed stock and the desired octane number of the product. Space velocity for a molybdenum oxide upon alumina gel catalyst may vary, for example, from about 1.5 wt./hr./wt. to about 0.15 wt./hr./wt.

The foregoing description contains a limited number of embodiments of the present invention. It will be understood, however, that this invention is not limited thereto since numerous variations are possible without departing from the scope of this invention.

What is claimed is:

1. The process for reforming hydrocarbons boiling within the motor fuel range in contact with finely divided reforming catalyst particles which comprises passing vaporous hydrocarbon feed and hydrogen-rich diluent gas through two dense, fluidized, liquid-simulating beds of finely divided reforming catalyst particles in series maintained at a pressure of from about 50 to 750 lbs. per sq. inch, the first bed having an average temperature of 850 to 900° F. and the second bed having an average temperature of about 900 to 950° F., continuously discharging a stream of catalyst from the second bed into the first bed, continuously withdrawnig a stream of catalyst particles from said first bed, mixing the withdrawn reactor catalyst particles with a non-oxidizing heat exchange gas at a temperature of about 1200° F. in sufficient amount to raise the temperature of the catalyst at least 25° F. higher than the average catalyst temperature in said second bed, separating the heated catalyst particles from the heat exchange gas, recycling the hot catalyst particles to the said second bed of the series, recompressing the heat exchange gas sufficiently for recycling through the catalyst heating system, reheating the recompressed heat exchange gas and recycling the reheated heat exchange gas through the catalyst heating sytsem.

2. The process as defined in claim 1 in which the catalyst comprises molybdenum oxide on alumina.

3. The process as defined in claim 1 in which the catalyst comprises platinum on alumina.

References Cited in the file of this patent

UNITED STATES PATENTS

| | | |
|---|---|---|
| 2,459,836 | Murphree | Jan. 25, 1949 |
| 2,602,771 | Munday et al. | July 8, 1952 |
| 2,642,381 | Dickinson | Jan. 16, 1953 |
| 2,656,304 | McPherson et al. | Oct. 20, 1953 |